United States Patent [19]

Cuffiani et al.

[11] Patent Number: 4,517,307
[45] Date of Patent: May 14, 1985

[54] CATALYST COMPONENTS FOR THE POLYMERIZATION OF ETHYLENE AND OF MIXTURES THEREOF WITH OLEFINS AND CATALYSTS OBTAINED THEREFROM

[75] Inventors: Illaro Cuffiani, Ferrara; Paolo Longi, Milan; Umberto Zucchini, Ferrara; Gianni Pennini, Porotto, all of Italy

[73] Assignee: Montedison S.p.A., Milan, Italy

[21] Appl. No.: 452,152

[22] Filed: Dec. 22, 1982

[30] Foreign Application Priority Data

Dec. 24, 1981 [IT] Italy ............................ 25840 A/81

[51] Int. Cl.$^3$ ........................... C08F 4/62; C08F 4/64; C08F 4/68
[52] U.S. Cl. ................................. 502/119; 502/103; 502/104; 502/111; 502/117; 502/118; 502/125; 502/126; 502/127; 502/128
[58] Field of Search ............... 502/119, 127, 126, 128, 502/125, 118, 104, 111, 117, 103

[56] References Cited

U.S. PATENT DOCUMENTS

| | | | |
|---|---|---|---|
| 4,156,063 | 5/1979 | Giannini et al. | 502/127 X |
| 4,218,339 | 8/1980 | Zucchini et al. | 502/111 |
| 4,250,287 | 2/1981 | Matlack | 502/127 X |
| 4,325,837 | 4/1982 | Capshew et al. | 502/119 X |
| 4,329,253 | 5/1982 | Goodall | 502/111 |
| 4,331,561 | 5/1982 | Luciani et al. | 502/125 |
| 4,395,359 | 7/1983 | Wagner et al. | 502/119 X |

*Primary Examiner*—Patrick Garvin

[57] ABSTRACT

Components of catalysts for the polymerization of ethylene and of mixtures thereof with other olefins, in the form of emulsions or dispersions, in an inert liquid medium or in an inert gas phase of a liquid phase, comprising a compound of a metal of Groups IV to VI inclusive, of the Mendelyeev Periodic System, or a composition containing such a compound of the Mendelyeev Periodic System, which compound or composition is immiscible with aliphatic hydrocarbons, or which components are obtained from emulsions or dispersions, in an inert liquid medium or in gas phase, of a precursor of the catalyst component which, in the liquid state, is immiscible with the aliphatic hydrocarbons.

An object of this invention is to provide new catalyst components for use in the polymerization of ethylene and of mixtures thereof with olefins and the catalysts obtained therefrom.

More particularly, the invention provides new liquid catalytic components used in emulsion or dispersion in an inert liquid medium and the use of the catalysts deriving therefrom in the polymerization of ethylene and of mixtures thereof with alpha-olefins and/or with polyenes containing at least two double bonds.

14 Claims, No Drawings

CATALYST COMPONENTS FOR THE POLYMERIZATION OF ETHYLENE AND OF MIXTURES THEREOF WITH OLEFINS AND CATALYSTS OBTAINED THEREFROM

BACKGROUND OF THE INVENTION

It is known that the coordination catalysts commonly used in industrial practice are heterogeneous systems obtained by reaction of a transition metal compound (generally a Ti halide) with an organometal compound of the metals of Groups I to III of the Periodic System.

The transition metal compound used for the preparation of the catalyst is generally a solid insoluble in the hydrocarbon polymerization medium or is a liquid soluble in said medium.

Homogeneous coordination catalysts (soluble in the polymerization medium at least before the polymerization is started) are also known.

These systems, however, have not been adopted in industrial practice because the activity thereof, that at the beginning is also very high, decreases rapidly and thus does not result in high polymer yields.

Within the field of heterogeneous catalysts, supported catalysts have been adopted in industrial practice for some time. They are so highly active that expensive after-treatments of the polymer to free it from catalyst residues can be avoided. These catalysts are generally obtained from a catalyst component comprising a titanium compound supported on a magnesium halide in active form.

In the modern industrial processes using "high yield" supported catalysts there is the requirement of availability of catalysts with controlled morphology and particle size, capable of yielding a polymer in the form of particles reproducing the morphology and the particle size of the catalyst and furthermore endowed with high flowability and bulk density.

A catalyst having these characteristics has advantages not only during the polymerization step and facilitates the subsequent operations of transfer and/or treatment of the polymer, but can also eliminate the step of granulating the polymer, an operation which, as is known, requires large amounts of energy.

Until now, the methods employed for preparing catalysts having a controlled morphology and/or particle size have been based on operations, expensive per se, and which comprise the preformation of a precursor of the catalytic component in the form of particles having a controlled morphology and the subsequent transformation of those particles to obtain the true catalyst component, or the precipitation of the catalyst component under conditions in general very critical, followed by the steps of separation, washing and drying of the solid.

According to other methods, precursors of the catalyst component in the melted state are emulsified in an inert immiscible liquid and the emulsion is then subjected to quenching to solidify the dispersed liquid phase which is subsequently treated for the transformation thereof to the desired catalyst component.

Examples of these methods are described in U.S. Pat. No. 3,953,414 and in Belgian Pat. No. 878,347.

Heretofore, coordination catalysts have not been known wherein the component comprising the transition metal compound in the form of a liquid immiscible with the conventional polymerization solvents is employed in emulsion or dispersion in said liquid medium.

THE PRESENT INVENTION

We have now found, unexpectedly, that it is possible to obtain polymers of ethylene and copolymers thereof with olefins in the form of particles having controlled morphology and/or particle size, by carrying out the polymerization with catalysts obtained from emulsions or dispersions, in an inert liquid medium or in an inert gas phase of a liquid phase immiscible with the liquid medium, and comprising a compound or composition containing compounds of transition metals of Groups IV to VI of the Mendelyeev Periodic System which are immiscible, in the liquid state, with the aliphatic hydrocarbons normally used in the polymerization of olefins.

The catalyst components of the invention consist, in particular, of emulsions or dispersions comprising compounds or compositions containing compounds of Ti, V, Zr or Cr, particularly compounds of Ti, which are immiscible in the normal aliphatic hydrocarbons, (heptane, hexane and the like), in an inert liquid medium or in an inert gas phase of a liquid phase.

Within the scope of the invention fall also the liquid or solid catalytic components obtained by post-treatment of the catalytic emulsions or dispersions of the invention.

Also within the scope of our invention are the solid or liquid catalyst components obtained by subjecting to transformation post-reactions, to obtain the true catalytic component, emulsions or dispersions in an inert liquid medium or in an inert gas phase, of precursors of catalyst components which precursors are immiscible, in the liquid state, in said aliphatic hydrocarbons.

According to another embodiment of the invention, the transition metal compound immiscible with aliphatic hydrocarbons, or the liquid precursors, are adsorbed on solid porous supports having a controlled morphology and/or particle size, the support being then used in suspension in an inert liquid medium immiscible with the adsorbed liquid phase or dispersed in the gas phase. Examples of solid inert supports are silica, alumina and polymers in form of porous particles having controlled morphology and/or size.

Any transition metal compound of Groups IV to VI that is immiscible, in the liquid state, with the aliphatic hydrocarbons is suitable for the preparation of the emulsions or dispersions forming the catalytic components of this invention.

Similarly, any precursor of the catalytic components which is immiscible, in the liquid state, with the aliphatic hydrocarbons may be used to prepare the emulsions or dispersions useful for the preparation of the catalytic components of the invention, such as the reaction product of an anhydrous magnesium halide, in particular $MgCl_2$, or a Mg dialkyl or a Grignard reagent, with an anhydrous aluminum halide, in particular $AlCl_3$, in an aromatic hydrocarbon, in particular toluene, in the presence of a halogenated hydrocarbon, preferably 1,2-dichloroethane. To the oily liquid thus obtained (now immiscible in the same aromatic hydrocarbon) a titanium compound, in particular $TiCl_4$, is added. An oily liquid is obtained that is immiscible in the normal aliphatic hydrocarbons.

More specifically, the Mg and Al halides and the aromatic hydrocarbon are caused to react at the reflux temperature of the hydrocarbon in the Mg/Al/toluene molar ratio of 1:3:12.

To this suspension the halogenated hydrocarbon is added in the ratio of about 2 mols per mol of Mg halide and the mixture is heated until an oily liquid is formed. Then the Ti compound is added in a Ti halide/Mg halide ratio comprised in general between 0.1:1 and 1:1.

In the above preparation the halogenated hydrocarbon can be replaced by anhydrous gaseous hydrochloric acid or by a normally liquid halogenated transition metal compound. For example, $TiCl_4$ is particularly suitable to this purpose. In the latter case no further addition of the transition metal compound is needed to prepare the catalyst component.

According to another embodiment of the invention, the Mg dihalide can be added last and solubilized in the mixture obtained by first mixing $AlCl_3$ and toluene and by thereafter treating the mixture with the halogenated hydrocarbon or gaseous HCl or $TiCl_4$.

The oily liquid that is obtained before the addition of the Ti compound is, in itself, a precursor of the catalytic components that can be emulsified and the emulsion treated for the transformation thereof to the catalyst component.

In the above indicated preparation, the Al trihalide can be replaced by an alkyl Al-dihalide, the toluene by benzene, xylene and by similar aromatic hydrocarbons; 1,2-dichloroethane can be replaced by $C_2H_5Cl$, $C_3H_7Cl$, n—$C_4H_9Cl$, s—$C_4H_9Cl$, t—$C_4H_9Cl$, $C_6H_5Cl$, $CHCl_3$, $C_6H_5CH_2Cl$, $CH_2Cl_2$ and by similar alkyl, aryl or arylalkyl halides.

Another method of preparation consists in dissolving an anhydrous Mg halide in a Ti tetraalcoholate, in particular Ti tetrabutylate, and in flowing an anhydrous gaseous hydrohalogenic acid through the solution until an oily phase is separated. According to a modification of that method, the hydrohalogenic acid can be replaced by an acyl chloride, in particular acetyl chloride. The butyl acetate that is formed is partly removed until an oily liquid forms.

Other compounds suitable for the preparation of the catalytic components of the invention can be selected from compounds having the formula I

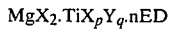

$$MgX_2 \cdot TiX_p Y_q \cdot nED \qquad (I)$$

that, in the liquid state, are immiscible with the aliphatic hydrocarbons. In the formula, X is a halogen atom; Y is an OR radical in which R is an alkyl, cycloalkyl, or aryl group containing from 1 to 18 carbon atoms; p is a number from 1 to 4; q is a number from zero to 3; p+q=4; n is a number from 3 to 6; ED is an electron-donor compound selected in particular from the esters of carboxylic aliphatic or aromatic acids.

Examples of compounds included in formula (I) are:

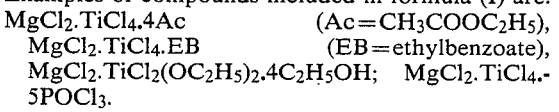

$MgCl_2 \cdot TiCl_4 \cdot 4Ac$ ($Ac = CH_3COOC_2H_5$),
$MgCl_2 \cdot TiCl_4 \cdot EB$ (EB = ethylbenzoate),
$MgCl_2 \cdot TiCl_2(OC_2H_5)_2 \cdot 4C_2H_5OH$; $MgCl_2 \cdot TiCl_4 \cdot 5POCl_3$.

The compounds of formula (I) are prepared by dissolving the Mg halide in the ED compound, by adding to the solution the stoichiometric amount of the Ti compound and then by causing the reaction to take place at reflux. The excess of the ED compound is removed by evaporation at the end of the reaction.

As disclosed hereinabove, the compounds or compositions containing the transition metal compounds, which form the emulsions or dispersions of the invention, can be subjected to modification or transformation reactions before the emulsions or dispersions are employed as catalyst component. Said reactions comprise reactions with electron-donor compounds, in particular esters, Al-alkyl compounds and silicon compounds.

The emulsion is then made to react, according to known methods, with reagents capable of transforming the adduct to active catalytic component.

Known transformation reactions for obtaining the catalytic component are those wherein the adduct is made to react with $TiCl_4$, with an Al-alkyl compound, or with halogenated silicon compounds such as $SiCl_4$ and halosilanes. Examples of these reactions are described in Belgian Pat. Nos. 857,574 and 878,347.

As disclosed hereinbefore, the oily liquid obtained from the reaction of $MgCl_2$, $AlCl_3$, toluene and dichloroethane can be utilized as precursor and caused to react in emulsion or dispersion with substances capable of transforming it to the catalytic component of the invention. For example, it can be reacted with $TiCl_4$ and alkyl hydropolysiloxanes, according to known methods.

Emulsification of the transition metal liquid compounds, as well as of the precursors, is carried out according to known techniques.

The liquid compounds can be dispersed in the same hydrocarbon medium used in the polymerization, optionally in the presence of surfactants of known type selected from those that are inert or poorly reactive toward the catalyst components. In the processes in gas phase, the transition metal compound can be dispersed directly in the gas phase containing the co-catalyst conventionally used in combination with the catalyst components based on compounds of the transition metal compounds.

Preferably, however, the transition metal compound is dispersed previously in an oil of parafinic, naphthenic, aromatic or siliconic type, the resulting dispersion or emulsion being then fed to the polymerization reactor containing the co-catalyst.

Examples of the useful oils are silicon oil Baysilon M 100 (Bayer), vaselin OB 55 (Rol), Cortis M 100 oil (Total), Circosol 2XH oil (Sunoco) and Dutrex R55 oil (Shell).

The addition of an electron-donor compound and/or of the co-catalyst in amounts in general comprised between 5 and 50% by weight on the amount of the transition metal compound during the emulsifying has beneficial effects on the morphologic characteristics of polymer.

In some cases, in particular when the emulsion is unstable over time or would create feeding problems, we have found it convenient to prepolymerize small amounts of ethylene or other olefin. The prepolymerization is carried out in general until a few grams of polymer per gram of catalyst component are formed.

A solid stable prepolymer is obtained having spherical and regular size particles which subsequently, during the polymerization step, maintain or reproduce the shape while growing, thus generating polymer particles that are also regular and spherical.

The co-catalysts to be utilized together with the catalytic components of the invention are the organometal compounds of Al, preferably the non-halogenated compounds, such as, for example, $Al(C_2H_5)_3$, $Al(iC_4H_9)_3$, $Al(n—C_4H_9)_3$, $Al(C_4H_9)_2H$, and $Al(C_6H_{13})_3$.

The polymerization ethylene or of mixtures thereof with alpha-olefins with these catalysts is carried out according to any of the known techniques, in the presence or absence of hydrocarbon media, in liquid or gas phase, at temperatures preferably comprised between 0° and 200° C. and by operating in general in the presence of regulators of the polymer molecular weight, such as hydrogen.

The catalysts prepared from the catalytic components of the invention are useful in the polymerization of both ethylene and of mixtures thereof with alpha-olefins, $C_3$-$C_{12}$, in particular butene, to obtain crystalline copolymers of ethylene containing minor amounts of polymerized alpha-olefins as well as to obtain elastomeric ethylene-alpha-olefin copolymers, in particular ethylene-propylene copolymers containing, optionally, unsaturations derived from polyenes having at least two double bonds.

In using the emulsified or dispersed catalyst component of the invention, precautions have to be taken to introduce the catalyst component into the polymerization reactor in the form of the emulsion or dispersion as prepared. Means to avoid the demixing of the dispersed or emulsified liquid phase are well known in the art. For instance, the emulsified or dispersed catalyst component should be introduced into the polymerization reactor under the polymerization conditions as quickly as possible, immediately after its preparation.

The advantages obtainable by the use of these catalysts are multiple. Besides being endowed with activities in general very high (such as not to require any purification treatment of the polymer obtained to free it from catalytic residues), show the advantage of furnishing polymer powders having excellent morphological characteristics, high bulk density and very restricted narrow particle size distribution. Consequently, the polymers possess such a high flowability and bulk density that they can be utilized directly in the conventional operations of molding and extrusion, without requiring the previous recourse to a costly granulating operation.

Another advantage of remarkable interest is the extreme simplicity of preparation of these catalysts, which reduces considerably the cost thereof, also with respect to other known, highly active catalysts.

The melt index E and respectively N were determined according to the ASTM methods D-1238 condition E and respectively N, measured at 190° C. and expressed in g/10 minutes.

The tamped bulk density was determined according to a method described in DIN 53194.

The particle size was determined according to ASTM D-1921-63.

The flowability and the poured bulk density were determined according to ASTM D-1895-69.

The following examples are given to illustrate the invention without limiting it.

EXAMPLES 1-8

Preparation of catalytic component A

The catalyst component A used in all tests of Examples 1-8 was prepared under the following conditions and with the following modalities:

9.5 g (0.1 mol) of anhydrous powdered magnesium chloride (water content lower than 1% by weight), 39.9 g (0.3 mol) of anhydrous aluminum trichloride, and 128 cc of anhydrous toluene were introduced in that order into a 500 cc flask fitted with mechanical stirrer, dropping funnel, reflux condenser and thermometer, that was previously flushed with nitrogen. The resulting toluene suspension was heated to 110° C. and maintained under stirring at that temperature for 2 hours. The mixture was then cooled to 45° C. and 15.7 cc of 1,2-dichloroethane were added to it through the dropping funnel.

After heating at 100° C. for 1 hours, a red-brownish liquid was obtained, to which, after cooling again to 45° C., 0.1 mol of $TiCl_4$ was fed.

After an additional 15 minutes stirring at 45° C., the solution obtained has a volume of 178 cc and the following composition:

Ti=2.35% by weight

Al=4.5% by weight

Cl=22.75% by weight

Mg=1.2% by weight.

The viscosity at 20° C. was 3.5 centistokes. The density at 20° C. was 1.13 g/cc.

Dispersion of catalytic component A

The apparatus for the dispersion or emulsifying of the catalytic components that was used in all examples consisted of a small turbostirrer (Ultra-Turrax TP 18/10, manufactured by Janke & Kunkel, IKA-WERK, STAUFEN), turning at a speed of 12,000 r.p.m. that was inserted in a 150 cc Keller-type flask fitted with a 50 cc graduated dropping funnel and a thermometer. The control of the temperature was carried out by immersing the flask in a methanol/dry ice cooling system. Prior to use, the apparatus was flushed with nitrogen.

The dispersing oil, the optional additives coadjuvant for the dispersion were introduced in that order into the flask, and the catalytic component was then introduced in the time of 5 minutes under the highest stirring while simultaneously cooling and maintaining the temperature at 20° C. The stirring was then continued for another 10 minutes.

At the end of the dispersion operation, and after reducing the stirring speed by 50%, the emulsion obtained was injected into the polymerization autoclave in the amounts reported in Table 1.

Polymerization of ethylene

The polymerization test of all examples was carried out in a 2.5 liter stainless steel autoclave fitted with a helicoidal blade stirrer operating at a speed of 600 r.p.m. and with an automatic thermostatic system.

At the moment of introducing the catalytic dispersion, the autoclave duly flushed with nitrogen, already contained 1 liter of anhydrous hexane and 7.5 mMols of Al-triisobutyl that were maintained under stirring at 60° C. After introduction of the catalytic component in the hexane, the temperature was raised to 75° C., 3 atm. of $H_2$ (partial pressure) were introduced and lastly the autoclave was pressurized with ethylene up to the total pressure of 14 atmospheres. The autoclave was then stirred for 2 hours while maintaining constant the pressure by continuous feeding of ethylene. The feed of ethylene was discontinued, the reactor was cooled to room temperature, the polymer was discharged and separated from hexane by filtration and then dried in nitrogen flow at 70° C. for 8 hours.

The amounts of the reactants used in the preparation of the dispersions of the catalytic component in the different types of oil and the polymerization results are reported in Table 1.

Example A of Table 1 reports the results of the polymerization of ethylene with the catalytic component A as such (not subjected to emulsifying).

EXAMPLES 9-15

Preparation of catalytic component B

The catalytic component B utilized in Example 9-15 was prepared under the conditions and with the operating modalities as follows:

0.2 mols of anhydrous powdered magnesium chloride and 0.4 mols of titanium tetrabutylate were introduced into a 1,000 cc flask fitted with mechanical stirrer, reflux condenser, thermometer and dropping funnel. The flask was heated at 140° C. for 3 hours.

The resulting solution, cooled to 60° C., was diluted with 640 cc of anhydrous n-heptane. Then gaseous anhydrous hydrochloric acid was introduced by means of a glass tube immersed directly in the liquid phase at 20° C. and under stirring, in such amount as to maintain the temperature of the system at about 30° C. During this treatment, the solution first became turbid followed by the separation of an oily reddish phase immiscible in heptane.

After 3 hours the feed of hydrochloric acid was interrupted and the oily suspension was heated while stirring at 60° C. for 30 minutes. Said liquid suspension was transferred at room temperature to a dropping funnel and then the oily phase was separated. 206 cc of oily liquid were obtained which had the following composition by weight:

$Ti = 7.4\%$ $Mg = 1.75\%$ $Cl = 22.15\%$ $C_4H_9OH = 45.7\%$.

The viscosity of 20° C. was 180 cst and the density at 20° C. was 1.056 g/cc. For the dispersion or emulsifying of the catalytic component B in the different types of oil and for the experiments, with it, including the polymerization tests therewith, the same operating modalities described for the catalytic component A were adopted. The results are reported in Table 2.

In Example B of Table 2 the results of polymerization of ethylene using the catalytic component B as such (not dispersed) are also reported.

TABLE 1

| EXAMPLE No | A | 1 | 2 | 3 | 4 | 5 | 6 | 7 | 8 |
|---|---|---|---|---|---|---|---|---|---|
| DISPERSION OF THE CATALYTIC COMPONENT | | | | | | | | | |
| DISPERSING AGENT | | | | | | | | | |
| Type | — | BAY-SILON M 100 oil | BAY-SILON M 100 oil | BAY-SILON M 100 oil | BAYSILON M 100 oil | VASELIN OB 55 oil | CORTIS M 100 oil | CIRCOSOL 2XH oil | DUTREX R 55 oil |
| Viscosity at 20° C. (cst) | — | 140 | 140 | 140 | 140 | 55 | 500 | 91.5 | 175 (100° C.) |
| Quantity (cc) | — | 20 | 15 | 20 | 20 | 20 | 20 | 20(1) | 20(1) |
| ADDITIVE | | | | | | | | | |
| Type | — | — | — | n.butyl ether | 4 mM Al(isobutyl) + n.butyl ether | — | — | — | — |
| Quantity (cc) | — | — | — | 3 | 3 | — | — | — | — |
| Catalytic liquid A (cc) | — | 20 | 30 | 20 | 20 | 20 | 10 | 10(1) | 10(1) |
| POLYMERIZATION RESULTS | | | | | | | | | |
| Dispersed catalyst used (cc) | 0.3 | 0.5 | 0.15 | 0.3 | 0.3 | 0.3 | 0.1 | 0.15 | 0.3 |
| Weight polymer obtained (g) | 239 | 135 | 198 | 205 | 183 | 121 | 185 | 270 | 104 |
| Yield (g. pol./g. Ti) · $10^{-3}$ | 30 | 20 | 75 | 55 | 49 | 30 | 209 | 203 | 39 |
| Melt Index E (g/10') | 0.21 | 0.4 | 0.45 | 0.5 | 0.21 | 0.25 | 0.35 | 0.23 | 0.14 |
| Melt Index N / Melt Index E | 10.7 | 8.1 | 9.2 | B | 7.6 | 11.6 | 8.3 | 8.9 | 7.2 |
| Tamped bulk density (g/cc) | 0.25 | 0.39 | 0.27 | 0.41 | 0.43 | 0.27 | 0.35 | 0.23 | 0.18 |
| POLYMER MORPHOLOGY | | | | | | | | | |
| Spherical polymer | NO | YES | YES | YES | YES | YES | YES | NO | YES |
| Particle form polymer | NO | NO | NO | NO | NO | NO | YES | YES | NO |
| Irregular polymer in powder | YES | NO | NO | NO | NO | YES | NO | NO | YES |

(1)Dispersion carried out at 50° C.

TABLE 2

| EXAMPLE No | B | 9 | 10 | 11 | 12 | 13 | 14 | 15 |
|---|---|---|---|---|---|---|---|---|
| DISPERSION OF THE CATALYTIC COMPONENT | | | | | | | | |
| DISPERSING AGENT | | | | | | | | |
| Type | — | BAYSILON | BAYSILON | VASELIN | CORTIS | CIRCOSOL | DUTREX | n-HEPTANE |

TABLE 2-continued

| EXAMPLE No | B | 9 | 10 | 11 | 12 | 13 | 14 | 15 |
|---|---|---|---|---|---|---|---|---|
| | | M 100 oil | M 100 oil | OB 55 oil | 100 M oil | 2XH oil | R 55 oil | |
| Viscosity at 20° C. (cst) | — | 140 | 140 | 55 | 500 | 91.5 | 17.5 (100° C.) | 0.57 |
| Quantity (cc) | — | 20 | 10 | 20 | 20 | 20 | 20 | 50 |
| ADDITIVE | | | | | | | | |
| Type | — | — | Al(n-octyl)$_3$ | — | — | — | — | FENOROL 10 |
| Quantity (cc) | — | — | 3.7 (m.mols) | — | — | — | — | 0.03 (g) |
| Catalytic liquid B (cc) | — | 20 | 20 | 10 | 10 | 10 | 10 | 10 |
| POLYMERIZATION RESULTS | | | | | | | | |
| Dispersion used (cc) | 0.01 | 0.01 | 0.02 | 0.05 | 0.03 | 0.05 | 0.05 | 0.02 |
| Weight polymer obtained (g) | 154 | 91 | 178 | 123 | 234 | 268 | 91 | 103 |
| Yield (g. pol./g Ti) × 10$^{-3}$ | 197 | 233 | 171 | 95 | 299 | 206 | 70 | 396 |
| Melt Index E (g/10') | 0.25 | 0.3 | 0.25 | 0.15 | 0.18 | 0.23 | 0.2 | 0.12 |
| Melt Index N / Melt Index E | 8 | 8.1 | 7.8 | 8.0 | 10 | 7.4 | 8 | 7.5 |
| Tamped bulk density (g/cc) | 0.35 | 0.33 | 0.35 | 0.22 | 0.24 | 0.28 | 0.23 | 0.21 |
| POLYMER MORPHOLOGY | | | | | | | | |
| Spherical polymer | NO | NO | YES | YES | YES | YES | YES | YES |
| Particle form polymer | NO | YES | NO | YES | YES | NO | YES | YES |
| Irregular polymer in powder | YES | YES | NO | NO | NO | YES | NO | NO |

EXAMPLES 16 and 17

Preparation of catalytic component C

The catalytic component C utilized in Examples 16 and 17 was obtained in the following manner:

0.2 mols of anhydrous powdered MgCl$_2$ and and 0.16 mols of titanium tetrabutylate were introduced in that order into a 250 cc flask fitted with mechanical stirrer, reflux condenser and thermometer.

The flask was heated while stirring the suspension at 140° C. for 3 hours. A milky liquid was obtained, to which, after cooling to room temperature, 1.2 mols of acetyl chloride were added in 30 minutes.

The suspension thus obtained, while still under stirring, was heated at boiling (73° C.) for 2 hours. Then the unreacted acetyl chloride was removed by distillation. The temperature in the flask was allowed to increase to 125° C. At this point, the residue has the appearance of an oily redbrownish mass. It amounted to 90 cc and had a density of 1.25 g/cc at 20° C.

The results of the polymerization tests are reported in Table 3. Test C was carried out using the catalytic component C not dispersed.

TABLE 3

| EXAMPLE No | C | 16 | 17 |
|---|---|---|---|
| DISPERSION OF THE CATALYTIC COMPONENT | | | |
| DISPERSING AGENT | | | |
| Type | — | BAYSILON M 100 OIL | CORTIS M 100 OIL |
| Viscosity at 20° C. (cst) | — | 140 | 500 |
| Quantity (cc) | — | 20 | 20 |
| Catalytic liquid C (cc) | — | 10 | 10 |
| POLYMERIZATION RESULTS | | | |
| Catalytic dispersion used (cc) | 0.2 | 0.3 | 0.2 |
| Weight polymer obtained (g) | 287 | 182 | 230 |
| Yield (g. pol/g Ti) | 16,000 | 20,000 | 38,000 |
| Melt Index E (g/10') | 0.07 | 0.07 | 0.07 |
| Melt Index N / Melt Index E | 10.2 | 9.7 | 9.3 |
| Tamped bulk density (g/cc) | 0.23 | 0.27 | 0.28 |
| POLYMER MORPHOLOGY | | | |
| Spherical polymer | NO | YES | YES |
| Particle form polymer | NO | YES | YES |
| Irregular polymer in powder | YES | NO | NO |

EXAMPLE 18

The following substances were used for the preparation of the dispersion of the catalytic component:

Baysilon M 100 oil = 30. cc n-butyl ether = 4.5 cc

Catalytic component A = 30. cc.

The resulting dispersion was introduced into a 2.5 l reactor containing 1,000 cc of anhydrous hexane and 0.1 mol of aluminum triisobutyl at the temperature of 40° C. Ethylene was then introduced to a pressure of 0.6 atm. The polymerization started immediately and caused a temperature increase to 45° C. While maintaining said conditions constant, ethylene was continuously fed for 30 minutes, i.e., until about 3 g of ethylene were polymerized per gram of catalytic component A.

The pre-polymerized catalytic component was then discharged and, after removal of the solvent by filtration, it was subjected to two washings with anhydrous hexane at room temperature.

The catalytic component in hexane suspension was then used in subsequent tests of ethylene polymerization, in order to evaluate the possible variations in performance with respect to time (ageing).

Table 4 reports the results of said tests (ageing of the prepolymerized catalysts: zero days; (5 days; and 13 days). Furthermore, some morphological characteristics of the polymers obtained (flowability and particle size distribution) are reported.

In all cases the powders obtained consisted wholly of spherical particles.

In the case of the polymer obtained with aged catalyst, the analysis of the catalytic residues furnished the following results:

Ti=2. ppm

Cl= <25. ppm

Mg=4.6 ppm

Total ashes=0.095%

The polymerization test was carried out under the conditions of Examples 1–8 with the difference that the polymerization time was 4 hours instead of 2 hours.

TABLE 4

| Ageing of the prepolymerized catalyst | zero days | 5 days | 13 days |
|---|---|---|---|
| Yield (g polymer/g Ti) | 313,000 | 340,000 | 315,000 |
| Melt Index E (g/10') | 0.23 | 0.14 | 0.2 |
| Melt Index N / Melt Index E | 8 | 8.3 | 8.3 |
| Tamped bulk density (g/cc) | 0.4 | 0.41 | 0.4 |
| Flowability (sec.) | 17.5 | 17 | 18 |
| PARTICLE SIZE DISTRIBUTION (% BY WEIGHT) | | | |
| >1000μ (and <2000μ) | 25.1 | 30.4 | 30.2 |
| >500μ % | 53.3 | 52.1 | 54 |
| >177μ % | 19.7 | 16.7 | 15 |
| >105μ % | 1.6 | 0.5 | 0.5 |
| <105μ % | 0.3 | 0.3 | 0.3 |

EXAMPLE 19

300 g of polyethylene obtained according to Example 18 (ageing time of 5 days) were introduced into a 3 liter stainless steel autoclave fitted with an anchor-shaped stirrer. After heating at 80° C. for 1 hour under a nitrogen flow and under stirring at intervals, the polymer was mixed with 0.5 g of aluminum triisobutyl diluted in 500 g of propylene. The mixture was stirred at 70° C. for 2 hours and then all propylene was removed slowly.

0.634 g of prepolymerized catalyst (obtained as described in Example 18) and then, at the temperature of 60° C. 1 g of aluminum triisobutyl dissolved in 20 cc pentane, were charged into the reactor.

The reactor was heated at 75° C. and while maintained under stirring was charged with 1.8 atm. of hydrogen and then with ethylene up to a total pressure of 9 atm. The pressure was maintained constant during the polymerization by continuous addition of ethylene.

After 4 hours, the reactor was degassed and the dry polymer was collected. It weighed 578 g. The yield was 231,000 g polymer/g titanium used.

The morphology of the obtained polymer was wholly spherical. The tamped bulk density was 0.38 g/cc. The flowability was 18 seconds.

The particle size distribution was as follows:

| | |
|---|---|
| ∅ > 1000μ (and <2000μ) | = 33.5% by weight |
| ∅ > 500μ | = 59.4% by weight |
| ∅ > 177μ | = 6.6% by weight |
| ∅ > 105μ | = 0.4% by weight |
| ∅ < 105μ | = 0.1% by weight. |

EXAMPLE 20

Two polymerization tests were carried out, one in hexane and the other in isobutane, and both were carried out in the presence of butene-1 in different amounts.

In the two tests, there was utilized a prepolymerized catalyst from the same preparation used for the polymerizations reported in Table 4, except that it was aged for 90 days.

The autoclave used was entirely similar to that of the preceding polymerization, except that it had a capacity of 1.5 l instead of 2.5 l.

Polymerization in hexane

Anhydrous hexane containing Al-triisobutyl and the prepolymerized catalyst were charged into the autoclave duly flushed with nitrogen. The reactor was heated at 70° C., hydrogen was flowed in and the reactor was pressurized with hydrogen up to 3 atmospheres. Simultaneously 18 g of butene-1 and ethylene up to a total pressure of 14 atmospheres were introduced. The pressure was maintained constant by introducing continuously ethylene and butene, the latter in an amount of 0.6 g per each 30 g of ethylene fed.

After 2 hours polymerization, the reactor was degassed and cooled by stripping with steam. The polymer was recovered from the slurry and then dried at 70° C. in a nitrogen flow for 12 hours.

Polymerization in isobutane 20 cc hexane containing the catalyst and Al-triisobutyl were charged into the flushed autoclave wherein a flow of isobutane was maintained. Then isobutane in the liquid state was introduced. The reactor was heated at 70° C. (isobutane pressure=10 atm.). 4 atmospheres of hydrogen were introduced therein and simultaneously 180 g of butene-1 and ethylene up to a total pressure of 29.5 atmospheres. The polymerization was continued in these conditions for 2 hours, by adding 2.95 g of butene-1 per each 30 g of ethylene fed.

The reactor was degassed and cooled to room temperature. The polymer was recovered and dried at 70° C. in a nitrogen flow for 12 hours.

The data concerning both tests and the results are reported in Table 5.

TABLE 5

| Polymerization in | hexane | isobutane |
|---|---|---|
| Hexane (cc) | 700 | 20 |
| Isobutane (g) | — | 220 |
| Al-triisobutyl (g) | 1 | 1 |
| Prepolymerized catalyst (g) | 0.3 | 0.625 |
| Butene-1 (g) initial feed | 18 | 180 |
| Butene-1 (g) total feed | 19.2 | 194.75 |
| Obtained polymer (g) | 65 | 175 |
| Yield (g/g Ti) | 114,000 | 147,000 |
| Melt Index E (g/10') | 0.17 | 1.6 |
| N/E | 10.6 | 7.6 |
| F/E | 31.2 | 25.6 |
| Bonded butene (% by weight) | <2 | 4.5 |
| Density (g/cc) | 0.9394 | 0.9262 |
| Bulk density (Tamped)(g/cc) | 0.31 | 0.33 |
| Flowability of the polymer (sec.) | 23 | 24.4 |
| PARTICLE SIZE | | |

TABLE 5-continued

| Morphology | wholly spherical | wholly spherical |
|---|---|---|
| >2000μ (% by weight) | 0.9 | 1.4 |
| >1000μ (% by weight) | 26.1 | 23 |
| >420μ (% by weight) | 52.9 | 57.2 |
| >250μ (% by weight) | 12.8 | 12.3 |
| >149μ (% by weight) | 5.3 | 4.4 |
| >105μ (% by weight) | 1.2 | 1.0 |
| <105μ (% by weight) | 0.8 | 0.7 |

Excluding silicon oil, the carbon of the chemical structures of the dispersing oils used in Examples 5 and 11, respectively 6 and 12; 7 and 13; and respectively 8 and 14 was distributed percentwise as follows:

| Oil | Aromatic carbon | Naphthenic carbon | Paraffinic carbon |
|---|---|---|---|
| Vaselin OB 55 | — | — | 100 |
| Cortis 100 M | 7 | 28 | 65 |
| Circosol 2XH | 20 | 39 | 41 |
| Dutrex R 55 | 49 | 35.5 | 17.5 |

EXAMPLE 21

60 cc of Baysilon M 100 silicon oil and 2.4 g of anhydrous magnesium chloride were introduced in that order into a 200 cc Keller type flask fitted with a turbostirrer of the type used in Examples 1–8 and of a dropping funnel. 4.35 cc of anhydrous ethanol were added slowly to the mixture. The suspension was heated slowly to 80° C. and then to 125° C. after inserting a reflux condenser on the Keller in order to stop the evolution of ethanol vapors.

The emulsifying of the MgCl$_2$.alcohol adduct that was formed was obtained by vigorous stirring. 300 cc of ISOPAR G and 8.25 cc of TiCl$_4$ were introduced into a glass vessel with jacket for the circulation of a thermostatic liquid, and fitted with mechanical stirrer, reflux condenser and thermometer.

The temperature of the solution was increased to 120° C. and at said temperature the whole volume of the emulsion obtained as indicated was introduced into the solution slowly (about 5 minutes). The whole system was maintained at 120° C. for 1 more hour.

After removing the liquid by siphoning, the solid was washed with hot isopar G. A sample containing 0.004 g of solid catalystic component was taken from the suspension of the last washing and used in a polymerization test of ethylene that was carried out under the conditions described in Examples 1–8.

50 g of polymer (yield of 12,500 g/g catalytic component) were obtained in the form of particles having a controlled particle size (the size of most of the particles was comprised between 500 and 1000 micron).

EXAMPLE 22

Example 21 was repeated except that the emulsion of the adduct of MgCl$_2$ and ethanol was added to a solution of 8.3 cc of TiCl$_4$ in 300 cc of ISOPAR G that was maintained at 120° C. At about half way through the addition of the emulsion, another 813 cc of TiCl$_4$ were added, and the addition of the emulsion was then completed.

In a polymerization test carried out under the conditions of Example 21 and using 0.0055 g of catalytic component, 120 g of polymer was obtained in the form of spheroidal particles having a size mainly comprised between 500 and 1000 micron.

We claim:

1. An emulsion or dispersion, in an inert liquid medium or in an inert gas phase of a liquid phase, of a catalyst component selected from the group consisting of
   (1) compounds of transition metals of Groups IV to VI, inclusive, of the Mendelyeev Periodic System and which, in the liquid state, are immiscible in aliphatic hydrocarbons;
   (2) compositions comprising transition metal compounds of the Groups indicated in (1) above and which, in the liquid state, are immiscible in aliphatic hydrocarbons; and
   (3) transformation products of precursors of components (1) and (2), said precursors of components (1) and (2), said precursors in the liquid state being immiscible in aliphatic hydrocarbons;
said emulsion or dispersion being directly usable in the preparation of coordination catalysts having a controlled morphology and/or particle size, which catalysts polymerize ethylene and mixtures thereof with other olefins to polymers having controlled morphology and/or particle size.

2. A catalyst component according to claim 1 in which the transition metal compound is selected from the compounds of Ti, V, Zr, and Cr.

3. A catalyst component according to claim 1, in which the dispersed liquid phase comprises compunds of Ti and Mg.

4. A catalyst component according to claim 3, in which the dispersed liquid phase containing the Ti and Mg compounds is obtained by reacting an anhydrous halide of Ti and Mg and an aluminum halide or alkyl-Al-dihalide in an aromatic liquid hydrocarbon, in the presence of a halogenated hydrocarbon, or by reacting an anhydrous halide of Mg and a Ti alcoholate, in the presence of an anhydrous hydrohalogenic acid.

5. A catalyst component according to claim 3, in which the dispersed liquid phase comprises a Ti/Mg compound having the formula:

$$MgX_2.TiX_pY_q.nED$$

wherein X is a halogen: Y is a radical OR in which R is an alkyl, cycloalkyl or aryl group containing from 1 to 18 carbon atoms; p is an integer from 1 to 4; q is a number from zero to 3; p+q=4; n is a number from 3 to 6; ED is an electron-donor compound.

6. A catalyst component according to claim 1, in which the compound or composition containing the transition metal compound is subjected to reactions and/or to modifying treatments with electron-donor compounds, alkyl aluminum compounds and silicon compounds before the emulsion or dispersion is used as a catalyst component.

7. A catalyst component according to claim 6, in which the emulsion or dispersion is reacted with a compound selected from the group consisting of Al-alkyl compounds, silicon compounds and electron-donor compounds.

8. A catalyst component according to claim 7, in which the emulsion or dispersion is reacted with an Al-alkyl compound in the presence of an olefin.

9. A catalyst component according to claim 1, in which the precursor of the catalytic component is a compound or a composition containing a Mg compound.

10. A catalyst component according to claim 9, in which the Mg compound is selected from the adducts of a Mg halide with an electron-donor compound.

11. A catalytic component according to claim 10, in which the Mg compound is an adduct of a Mg halide with an aliphatic, cycloaliphatic or alkylaryl alcohol.

12. A catalyst component according to claim 9, in which the emulsion or dispersion of the precursor of the catalytic component is reacted with a compound selected from Ti halides, Al-alkyl compounds and halogenated Si compounds.

13. A catalyst component according to claim 1, in which the aliphatic hydrocarbon-immiscible liquid compound of the transition metal is absorbed on solid porous supports having a controlled morphology and/or particle size.

14. A catalyst for the polymerization of ethylene and mixtures thereof with alpha-olefins which comprises the reaction product of an organometal compound of Al and a catalyst component according to claim 1.

* * * * *